United States Patent

Horino et al.

[19]

[11] Patent Number: 6,021,807
[45] Date of Patent: Feb. 8, 2000

[54] WATER REFILLING CONTROL MECHANISM FOR A WATER TANK

[75] Inventors: Masahiko Horino; Sung-An Lai, both of Taipei, Taiwan

[73] Assignee: Hocheng Corporation, Taipei, Taiwan

[21] Appl. No.: 09/137,117

[22] Filed: Aug. 20, 1998

[51] Int. Cl.$^7$ .................................................. F16K 31/18
[52] U.S. Cl. ............................. 137/423; 137/409; 4/353
[58] Field of Search .................................... 137/423, 409, 137/416, 417, 429, 430, 432, 434; 4/353

[56] References Cited

U.S. PATENT DOCUMENTS

| | | | |
|---|---|---|---|
| 3,040,769 | 6/1962 | Lamb | 137/423 |
| 5,205,319 | 4/1993 | Chiang | 137/423 |
| 5,303,728 | 4/1994 | Senatore | 137/423 |

*Primary Examiner*—David J. Walczak
*Attorney, Agent, or Firm*—Birch, Stewart, Kolasch & Birch, LLP

[57] ABSTRACT

A water refilling control mechanism for a water tank comprises a main float sliding along an inlet pipe and further having an extruder located at the bottom thereof for connecting with an extension bar and further connecting to a supporting bar and a water valve on top of the inlet pipe. The main float further includes a dual-stair-shape valley atop to accommodate an auxiliary float having a restraint arm with its upper end connecting with a restraint cam located on top of the inlet pipe. By providing a C-shape end to the restraint arm connected engaging the restraint cam with an extruding arm, the auxiliary float can be restrained in the valley by a bump at the lower end of the restraint arm and can be rotated clockwise to release the main float as the water level reaching a substantial height. In the present invention, the main float is kept in the water by the auxiliary float atop while in the early stage of the water feeding process, for accumulating enough buoyant energy; until the auxiliary float is drifted away, the accumulated buoyant energy in the main float is suddenly released for generating a huge pressure rapidly to block the water valve for stopping the water feeding process.

5 Claims, 3 Drawing Sheets

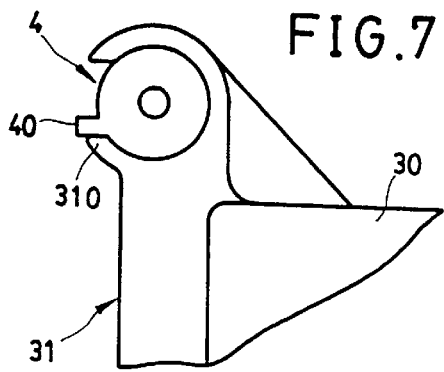
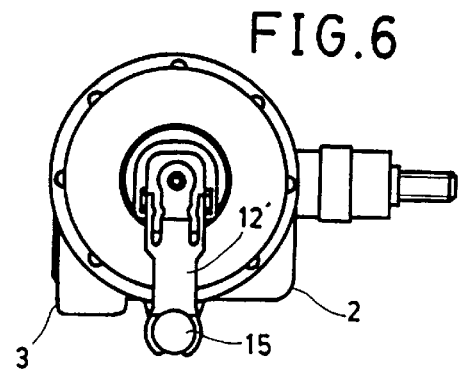
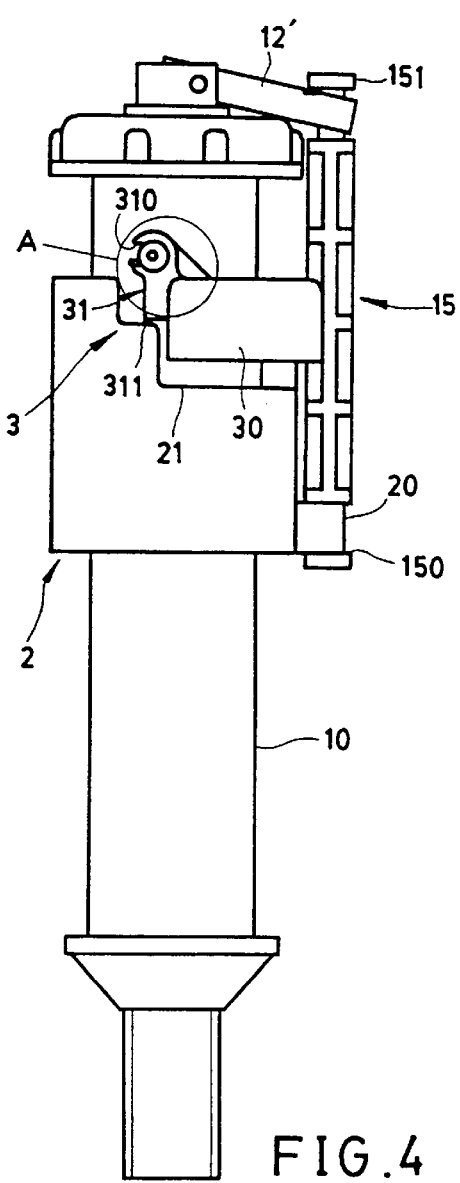
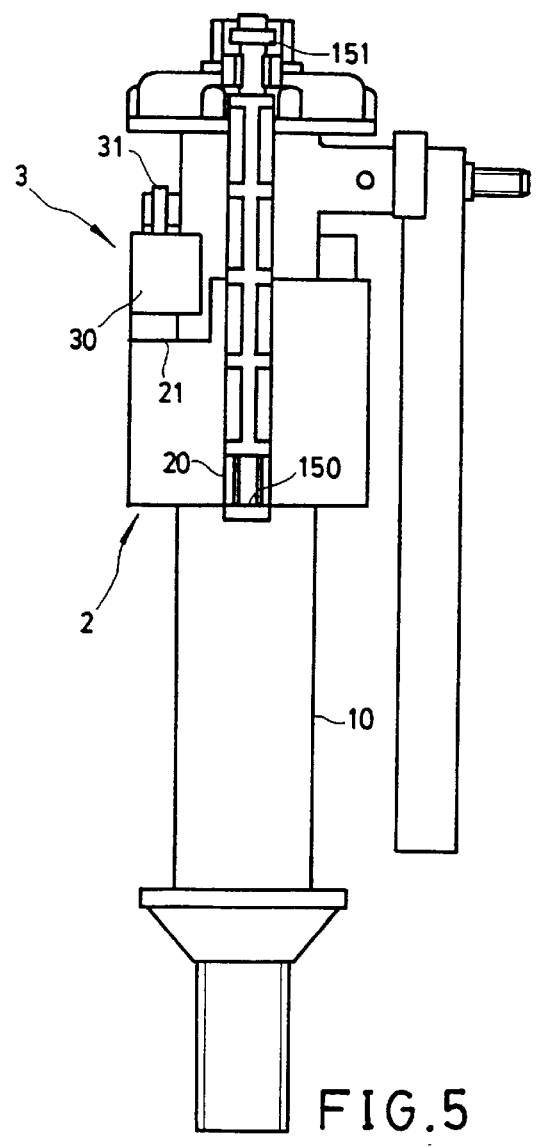

WATER REFILLING CONTROL MECHANISM FOR A WATER TANK

BACKGROUND OF THE INVENTION (1) Field of the Invention

The invention relates to a water refilling control mechanism for a water tank, and more particularly to which comprises a main float and an auxiliary float for temporarily suppressing the main float during water feeding, and suddenly stopping the water feeding by releasing the suppressed main float after reaching a substantial water lever.

(2) Description of the Prior Art

It is well known that a water tank, especially one used in a toilet, needs plenty of water daily to perform its function. The water refilling process of a water tank is controlled by a set of water feeding control devices for automatically regulating the water feeding into the water tank. Conventionally, most water tanks in the market utilize a water feeding control device as shown in FIG. 1. The water feeding control device comprises an inlet pipe 10 installed upright from the bottom of the water tank, a float ball 11, a supporting bar 12, an adjusting head 13, and a water valve 14. The elevation of the float ball 11 in the water tank is determined by the water level therein. The movement of the float ball 11 is transmitted to the adjusting head 13 via the supporting bar 12 connected with the float ball 11 at one end, and connected pivotally close to the adjusting head. By the levering theory, the adjusting head 13 will be pressed down or be released by the other end of the supporting bar 12 for automatically controlling the water valve to stop the water refilling or process the water feeding, respectively, while the float ball 11 is moving up or down accordingly to the water level in the water tank. In such a design of a known water feeding control device, the magnitude of the pressure in the water valve 14 for stopping the water feeding is determined by the buoyant force of the float ball 11 and the length of the supporting bar 12. Therefore, to provide a sufficient stopping pressure for the water valve 14, a large-volume float ball 11 and a lengthy supporting bar 12 are usually seen for the water feeding control device in the art.

In the water feeding control device shown in FIG. 1, the supporting bar 12 rotates pivotally with the elevating of the float ball 11, and the adjusting head 13 is then pressed down by one end of the supporting bar 12, while the water level reaches a substantial level, in order to directly stop the water feeding by closing the water valve 14. The efficiency of such a water feeding control algorithm is highly dependent upon the length of the supporting bar 12 and the volume of the float ball 11. Thus, a large float ball 11 and a long supporting bar 12 are necessary for obtaining better performance of the water feeding control device.

To overcome the aforesaid disadvantage in the known water feeding control device and to minimize the volume of a water tank, a membrane-type water feeding control device has been developed. As shown in FIG. 2, the water valve 14 utilized in a membrane-type water feeding control device comprises a stopper 140 directly connected with the adjusting head 13. The stopper 140 is further shielded by a first spring 141 and is located on top of an air hole 143 of a top cover 142. Beneath the air hole 143 is a membrane 145 supported by a second spring 144. The membrane 145 further includes a through needle 146 located thereof in the middle. The control of this type of water feeding control device begins with the supporting bar 12 pressing down the adjusting head 13 and then the stopper 140, the stopper 140 blocking the air hole 143, the air chamber 147 between the stopper 140 and the membrane 145 generating a pressure to press down the membrane 145 at the central area thereof so as to block the water inlet 148 thereunder, and finally blocking the water feeding by blocking the water outlet 149. The membrane-type water feeding control device utilizes the pressure difference to control the water feeding. Therefore, the supporting bar 12 and the float ball 11 are deemed as auxiliary parts, so that the length of the supporting bar 12 and the volume of the float ball 11 less important. As a matter of fact, the volume of water tank utilizing a membrane-type water feeding control device can be reduced by using a shorter supporting bar 12 and a smaller float ball 11.

Referring now to FIG. 3, the supporting bar 12' and the float ball 11' can be modified accordingly. In this embodiment shown in FIG. 3, the float ball 11' is installed as a sliding block along the inlet pipe 10, and the supporting bar 12' is indirectly connected with the float ball 11' by a vertical extension bar 15. The float ball 11' is to float up according to rising of the water level, and the supporting bar 12' is pushed by the extension bar 15 to stop the water feeding.

Compared with the traditional water tank, the water tank utilizing a membrane-type water feeding control device can have a smaller volume and is conveniently to be manufactured as one piece. Although the introduction of the membrane-type water feeding control device did solve the volume problem of a conventional tank, yet another shortcoming of both types of aforesaid water tanks remained.

The problem comes from the float ball. In a conventional water tank, the only force source is the buoyant force of the float ball. So, as the water level in the water tank is rising, the float ball will float accordingly. As long as the water level reaches a substantial height, the water feeding will be stopped by the force exerted by the float ball. Nevertheless, a water feeding control device in the art only has ⅓ of total volume of the float ball under the water level. That is, only about 30% of total volume of the float ball contributes to the buoyant force in generating force for controlling the water valve to close the water feeding. Obviously, such a low ratio is unsatisfactory. Also, the force generated for control is usually insufficient. Therefore, as we have observed in the conventional water tank, the water level keeps rising gradually even after the float ball seems to reach the highest point and the inlet pipe seems to stop feeding water. After investigation, it is found that the major cause responsible to such phenomena is the low utilization ratio of the float ball volume toward the buoyant force generation; so that insufficient pressure is generated for blocking the water valve. As long as the water valve is not completely closed, the water will keep flowing into the water tank gradually. Such a flowing caused by insufficient pressure for closing the water valve not only shows that the conventional water tank needs to be further modified, but also.

SUMMARY OF THE INVENTION

Accordingly, it is a primary object of the present invention to provide a water refilling control mechanism for a water tank which can overcome the shortcomings of the water feeding control device in the art for reducing the volume of water tank and getting rid of the none-stop flowing problem.

The water refilling control mechanism for a water tank in accordance with the present invention, modifies the membrane-type water feeding device, and can rapidly stop the water refilling process. The present invention adds an auxiliary float over the main float. The auxiliary float comprises a restraint arm with its upper end connected with a restraint cam and having the restraint cam as a pivot center to rotate. Utilizing the aforesaid mechanism, while in a water feeding process, the main float will be restrained in the water by the bump of the restraint arm of the auxiliary float on top; until the auxiliary float begins to float up with the rising water level by counter-clockwise rotating pivotally around the restraint cam. Due to the sufficient buoyant energy accumulated in the main float, the release of the main float is sudden and generates an impulse pressure onto the water valve via the extension bar and the supporting bar for stopping the water feeding process.

According to the present invention, the main float is kept in the water by the auxiliary float atop while in the early stage of the water feeding process, for accumulating enough buoyancy energy over the buoyant provided by a traditional design, in which only ⅓ volume of the float ball is used to generate the required buoyant. When the auxiliary float rotates about the restraint cam, the accumulated buoyant energy in the main float is suddenly released for generating a large pressure to rapidly block the water valve; thus the flowing problem of the art after the water reaching the high water level can be successfully resolved.

Further scope of applicability of the present invention will become apparent from the detailed description given hereinafter. However, it should be understood that the detailed description and specific examples, while indicating preferred embodiments of the invention, are given by way of illustration only, since various changes and modification within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are limitative of the present invention, and wherein:

FIG. 4 is a front view of the preferred embodiment of the water refilling control mechanism for a water tank in accordance with the present invention.

FIG. 5 is a right side view of the preferred embodiment of the water refilling control mechanism for a water tank in accordance with the present invention.

FIG. 6 is a top view of the preferred embodiment of the water refilling control mechanism for a water tank in accordance with the present invention.

FIG. 7 is a partial enlarged view of area A in FIG. 4.

DESCRIPTION OF THE PREFERRED EMBODIMENT

The invention disclosed herein is directed to a water refilling control mechanism for a water tank. In the following description, numerous details are set forth in order to provide a thorough understanding of the present invention. It will be appreciated by one skilled in the art that variations of these specific details are possible while still achieving the results of the present invention. In other instance, well-known components are not described in detail in order not to unnecessarily obscure the present invention.

Figure 1:
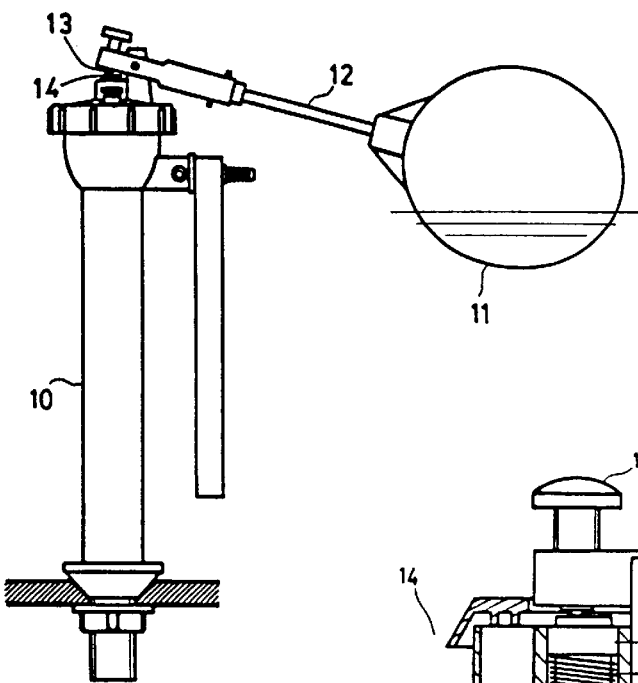
FIG. 1 is a schematic view of a water feeding control device for a water tank known in the art.
Figure 2:
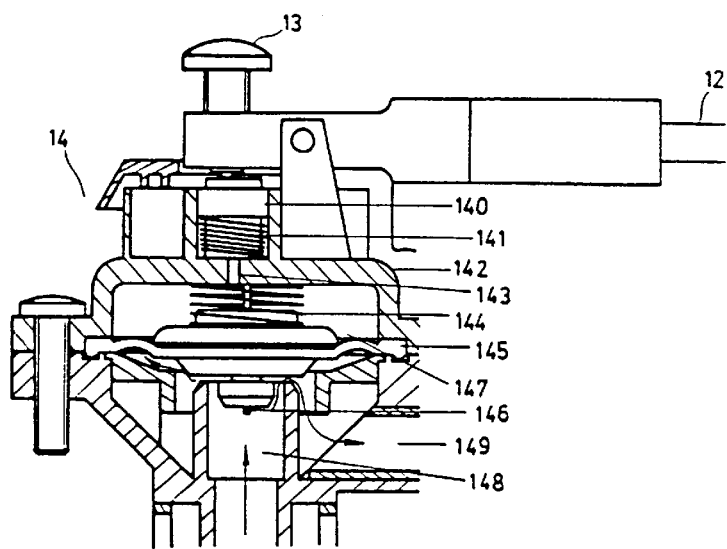
FIG. 2 is a cross sectional view of a membrane-type water feeding control device for a water tank known in the art.
Figure 3:
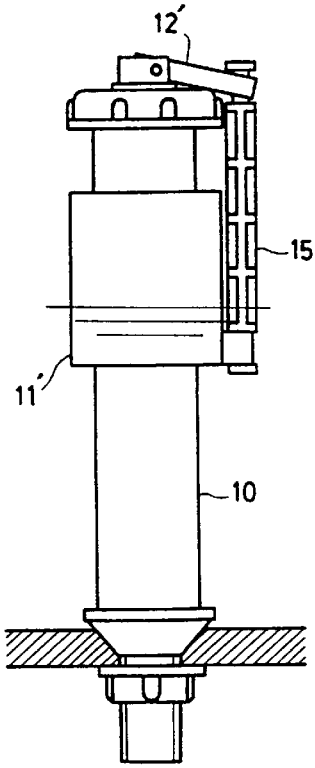
FIG. 3 is a schematic view of a membrane-type water feeding control device for a water tank known in the art.

Referring now to FIG. 4 to FIG. 7, it is shown that the water refilling control mechanism in accordance with the present invention is similar to that of a membrane-type water feeding device shown in FIG. 3. The main float 2 is penetrated by the inlet pipe 10 and slides along therewith. An extruder 20 extending from the bottom of the main float 2 is used to clamp the lower T-neck 150 of the extension bar 15. The upper T-neck located at the other end of the extension bar 15 is clamped by the supporting bar 12' at one end. The other end of the supporting bar 12' is utilized to actuate a water valve (not shown in figures) located on top of the inlet pipe 10. As shown in FIG. 4, the main float 2 further has a dual-stair-shape valley 21 atop.

The auxiliary float 3, located above the main float 2, comprises a floating block 30 and a restraint arm 31 connected with one side of the auxiliary float 30. The upper end of the restraint arm 31 is formed as a C-shaped end 310, and at the lower end of the restraint arm 31 further includes a bump 311. The C-shaped end 310 of the restraint arm 31 is engaged with a restraint cam 4 located above the inlet pipe 10. While the auxiliary float 3 is above the water level, the floating block 30 will rotate clockwise around the restraint cam 4 by its own weight, and the rotation will stop after the lower end of the C-shaped end 310 is stopped by an extruding arm 40 of the restraint cam 4. At this time, the bottom surface of the auxiliary float 3 is horizontal which only occurs when the water level in the water tank is low. The main float 2 is held motionless by the supporting bar 12' and the extension bar 15, and the auxiliary float 3 will not rotate further due to the constraint provided by the main float 2.

Figure 8D:
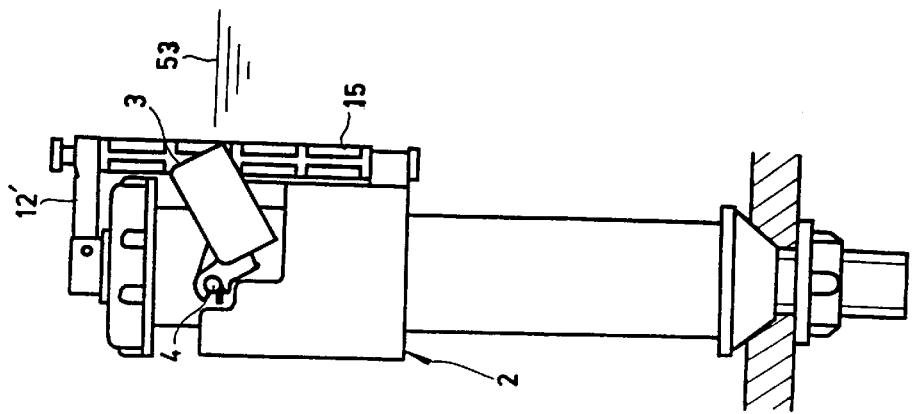
FIG. 8D is a side elevational view of the preferred embodiment of the water refilling control mechanism for a water tank in accordance with the present invention, at high water level.
Figure 8C:
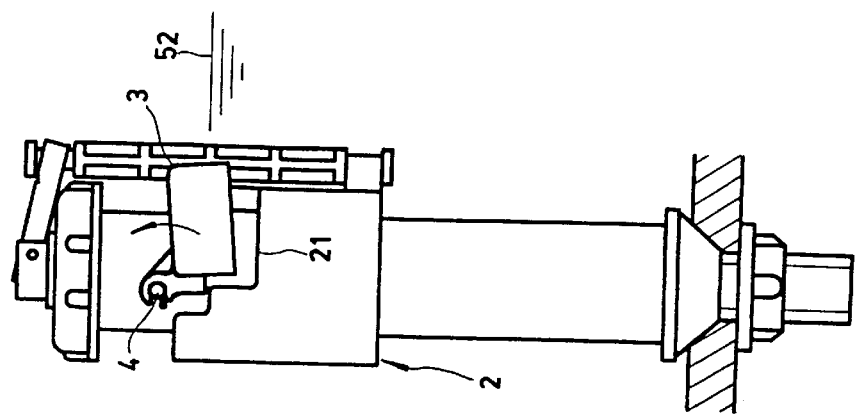
FIG. 8C is a side elevational view of the preferred embodiment of the water refilling control mechanism for a water tank in accordance with the present invention, at higher middle water level.
Figure 8B:
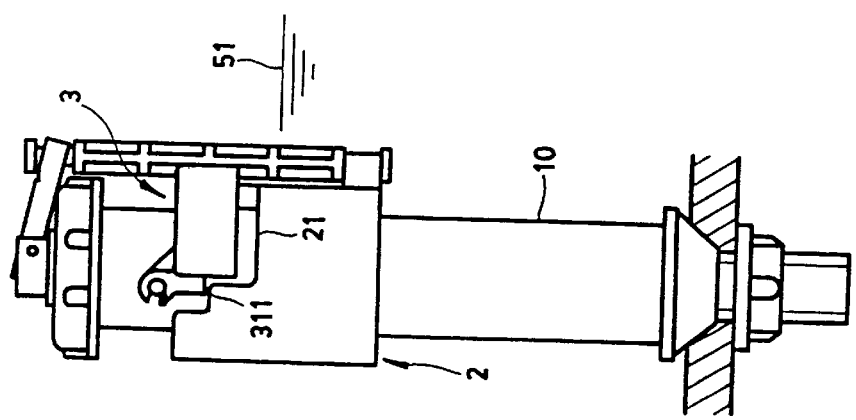
FIG. 8B is a side elevational view of the preferred embodiment of the water refilling control mechanism for a water tank in accordance with the present invention, at lower middle water level.
Figure 8A:
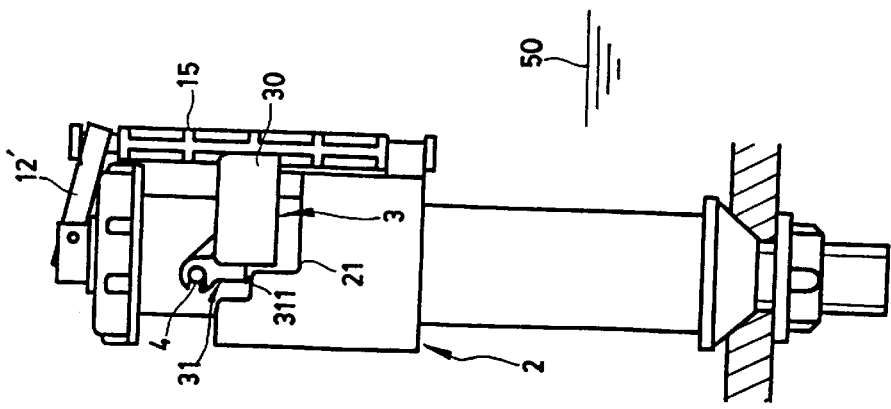
FIG. 8A is a side elevational view of the preferred embodiment of the water refilling control mechanism for a water tank in accordance with the present invention, at low water level.

Referring now to FIG. 8A to FIG. 8D, while a low water level 50 is shown in the water tank, the supporting arm 12' is at the lowest position, and so are the extension bar 15 and the main float 2. The floating block 30 of the auxiliary float 3 will rotate clockwise around the restraint cam 4 by its own weight, and the rotation will stop after the lower end of the C-shape end 310 is stopped by an extruding arm 40 of the restraint cam 4 (as shown in FIG. 8A).

When the water is fed into the water tank via the inlet pipe 10, the water level will rise gradually. In a conventional water feeding control device, the float ball will float while ⅓ of total volume of the float ball is below the water level. However, in the present invention, while the lower middle water level 51 is achieved, half volume of the main float 2 is in the water. Ordinarily, the main float 2 would float along the inlet pipe 10 as the water level is rising. But in the present invention, the up-going main float 2 is blocked by the bump 311 of the auxiliary float 3 at the upper stair-shape valley 21, and thus the main float 2 is kept in the water (as shown in FIG. 8B).

As shown in FIG. 8C, as soon as the higher middle water level 52 is achieved, i.e. ⅓ volume of the auxiliary float 3 is in the water, the auxiliary float 3 will begin to float and rotate counter-clockwise gradually around the restraint cam 4.

As shown in FIG. 8D, as the water level keeps rising, the auxiliary float 3 keeps floating and rotates further counter-clockwise around the restraint cam 4. Eventually the bump 311 at bottom end of the restraint arm will leave the upper stair-shape valley 21 of the main float 2, and the auxiliary float 3 will leave the lower stair-shaped valley 21. As soon as the auxiliary float 3 leaves the lower stair-shaped valley 21 of the main float 2, the constraint on the main float will be released, and the main float 2 will suddenly float up by the buoyant stored by the submerged main float 2. As the main float 2 goes up, the extension bar 15 as well as the supporting bar 12 are pushed up suddenly and exert an impulse pressure over the water valve to stop immediately the water feeding process. The water level at the same time is maintained at the high water level 53 as shown in FIG. 8D.

As the water in the water tank is released to flush, the auxiliary float 3 will rotate clockwise to the horizontal state as long as the main float 2 is back in its lowest position. At this time, the bump 311 of the restraint arm 31 will resume its constraint position at the upper stair valley 21 of the main float 2 (as shown in FIG. 8A).

In accordance with the present invention, the main float 2 is temporarily restrained in the water by the auxiliary float 3, for accumulating enough energy. As the main float 2 is suddenly released, the stored buoyant energy will be released rapidly to provide an impulse pressure for stopping the water feeding process.

While the present invention has been particularly shown and described with reference to a preferred embodiment, it will be understood by those skilled in the art that various changes in form and detail may be made without departing from the spirit and scope of the present invention.

What is claimed is:

1. A water refilling control mechanism for a water tank comprising:

an inlet pipe;

a restraint cam having an extruding arm located on a top portion of the inlet pipe;

an extension bar;

a water valve located on the top portion of the inlet pipe;

a supporting bar linking the extension bar to the water valve;

a main float slidably mounted on the inlet pipe, the main float including an extruder located at a bottom portion of the main float, and two step surfaces forming a valley on a top surface of the main float, the extruder being connectable to the extension bar for operation of the water valve; and an auxiliary float including a floating block, and a restraint arm connected to the floating block, the restraint arm including an upper C-shaped end, and a bump at a second end of the arm; wherein the C-shaped end engages the restraint cam, and connects the auxiliary float to the inlet pipe above said main float.

2. The water refilling control mechanism according to claim 1, wherein the auxiliary float is mounted within the valley on the top surface of the main float.

3. The water refilling control mechanism according to claim 1, wherein the auxiliary float is pivotally mounted around the restraint cam.

4. The water refilling control mechanism according to claim 3, wherein the extruding arm limits rotation of the auxiliary float by engaging the C-shaped end of the restraint arm.

5. The water refilling control mechanism according to claim 4, wherein when the C-shaped end of the restraint arm engages a bottom surface of the extruding arm, the auxiliary float is at a substantially horizontal position in the tank.

* * * * *